United States Patent
Perino

(10) Patent No.: US 6,593,961 B1
(45) Date of Patent: Jul. 15, 2003

(54) TEST EFFICIENT METHOD OF CLASSIFYING IMAGE QUALITY OF AN OPTICAL SENSOR USING THREE CATEGORIES OF PIXELS

(75) Inventor: Stanley C. Perino, Ft. Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/183,143

(22) Filed: Oct. 30, 1998

(51) Int. Cl.⁷ .............................................. H04N 17/00
(52) U.S. Cl. ..................................... 348/187; 348/247
(58) Field of Search ................................ 348/187, 246, 348/247; 382/145; 358/461

(56) References Cited

U.S. PATENT DOCUMENTS

| | | | | |
|---|---|---|---|---|
| 4,920,428 A | * | 4/1990 | Lin et al. ..................... | 348/246 |
| 5,185,883 A | * | 2/1993 | Ianni et al. .................. | 348/247 |
| 5,416,516 A | * | 5/1995 | Kameyama et al. ......... | 348/246 |
| 5,440,648 A | * | 8/1995 | Roberts et al. ............. | 382/141 |
| 5,467,128 A | * | 11/1995 | Yates et al. .................. | 348/187 |
| 5,657,400 A | * | 8/1997 | Granfors et al. ............ | 382/132 |
| 5,963,654 A | * | 10/1999 | Prakash et al. ............. | 382/112 |
| 6,002,433 A | * | 12/1999 | Watanabe et al. ........... | 348/246 |
| 6,035,072 A | * | 3/2000 | Read ........................... | 348/241 |
| 6,181,830 B1 | * | 1/2001 | Sato ............................ | 348/246 |
| 6,340,989 B1 | * | 1/2002 | Oda ............................. | 348/246 |

* cited by examiner

Primary Examiner—Wendy R. Garber
Assistant Examiner—Jason Whipkey

(57) ABSTRACT

A multi-threshold optical binning method for classifying the image quality of an optical sensor is presented. In accordance with the invention, a sensor tester causes a sensor pixel image to be generated by a sensor under test. The sensor pixel image is comprised of a plurality of pixels, each represented by an associated quantized intensity level. The quantized intensity level of a pixel may fall into one of a first pixel class, a second pixel class, or a third pixel class, for example, a dark pixel class, a dim pixel class, and an acceptable pixel class. An image filter processes the sensor pixel image, filtering but all pixels that fall within the acceptable pixel class, to generate a defective pixel map. The defective pixel map includes those pixels which have a quantized intensity level that falls within the first and/or second pixel class but not the third pixel class.

21 Claims, 6 Drawing Sheets

TEST EFFICIENT METHOD OF CLASSIFYING IMAGE QUALITY OF AN OPTICAL SENSOR USING THREE CATEGORIES OF PIXELS

FIELD OF THE INVENTION

The present invention pertains generally to image processing, and more particularly to a method and apparatus for classifying the image quality of an optical sensor using additional image characteristic thresholds.

BACKGROUND OF THE INVENTION

A digital image is an array of pixels, each of which is digitally quantized into an intensity level. Digital images are known to require a significant amount of storage area. For example, in a black-and-white image, a digital image comprising an array of 512×512 pixels, each quantized into a gray level represented by 8 bits, requires 0.25 megabytes of storage. An increase in the sampling rate (i.e., number of pixels in the array) and/or an increase in the quantization level (i.e., the number of bits, or gray, levels, that represent the image) further increases the amount of required storage for an image. The use of color, which is typically formed by varying the intensity levels of a combination of the three primary colors, red (R), green (G), and blue (B), and collectively known in the industry as the RGB components, also increases the amount of storage required. Accordingly, due to the large amount of data generated for a single image, the use of high-resolution digital images in computer applications was generally, until recently, somewhat limited.

With the leaps in amount of processing power and data storage capability in modern computer systems over the past few years, along with the lower costs and therefore increased availability to more end-users, the use of higher-resolution (represented by a larger number of pixels), higher-quality (represented by increased number quantization levels), and even color, digital images has become more and more viable.

At the same time, leaps in modern digital telecommunication system technology, including improvements in network bandwidth and network switching hardware for both the Internet and digital cellular systems, has increased both business and personal communication over networked computers. This has increased the demand for, and use of, digital images as a part of modern remote communication.

With the increased use of digital images in computer applications and communication, increased attention has been focused on the quality of the image. Digital images may be generated in a number of ways, including by way of microdensitometers, flying spot scanners, image dissectors, vidicon cameras, and photosensitive solid-state array sensors.

Microdensitometers and flying spot scanners receive input in the form of analog transparencies such as a film negative or a photograph, and digitize them into a digital pixel file. With image dissectors and vidicon cameras, an image is focused on a photosensitive tube whose response is proportional to the incident light pattern. The image dissector employs an electromagnet which is used to deflect the entire beam past a pinhole located in the back of the dissector tube. The pinhole lets through only a small cross-section of the beam which is quantized into a single pixel. The electromagnet must move the beam for each discrete pixel desired. With the vidicon camera, the image focused on the tube surface produces a pattern of varying conductivity that matches the distribution of intensity in the optical image. The conductivity pattern is scanned by an electron beam which converts into a signal proportional to the intensity pattern of the input image. This signal is then quantized to produce the digital image.

By far the most common method of generating a digital image is via solid-state arrays. Solid-state array sensors comprise an array of discrete silicon imaging elements called "photosites", and are generally organized into one of two geometrical arrangements. The first, known as a "line-scan sensor", comprises a row of photosites and produces a two-dimensional image by relative motion between the scene and the detector. The second, known as an "area sensor" is a two-dimensional matrix of photosites and captures the image in a similar manner as a vidicon camera.

In the manufacture of digital image sensors, the quality of the sensor is often categorized into different levels of classifications that are based on the image quality. For example, in solid-state array sensors, it is not uncommon to incur a defect in one or more of the photosites composing it, and a determination must be made as to whether the sensor should be kept or discarded. The classifications reflect the quality of the image produced by the array sensor, and are used to indicate the appropriate applications for which a particular array sensor is suited.

FIG. 1 is a two-dimensional pixel diagram illustrating a blank image 10 that contains several common types of defects. Defective pixels are darkened in this illustration. One type of defect is known as "point" defect. A point defect is a defect in a single pixel, such as pixels 12 and 20, with no defects in all of its N-nearest neighbor pixels. In a two-dimensional array, a pixel p at coordinates (x, y) has four horizontal and vertical neighbors located a unit distance from p at (x+1, y), (x−1, y), (x, y+1), and (x, y−1), and four diagonal neighbors located a unit distance from p at (x+1, y+1), (x+1, y−1), (x−1, y+1), and (x−1, y−1). As will be appreciated by those skilled in the art, pixels located along the borders of the image do not have a full set of neighbors since the position of some of their calculated neighbors reside outside the image.

A common method of specifying image quality is based on setting a single lower (dark) and/or upper (bright) threshold limit relative to the mean for dark and/or bright pixel intensity. FIG. 2 is a graph illustrating a prior art single-threshold defective pixel system. In this system, pixels with intensities below the dark and/or above the bright threshold limit are flagged as defects. FIG. 3(a) is a perspective view, and FIG. 3(b) is a side view, of the pixel image of FIG. 1, where the quantized intensity level is plotted along the z-axis.

Image quality is categorized into classifications based on the size of the largest allowed cluster and the number of single pixel and cluster defects. Typically a point defect, illustrated at 12 and 20 in FIGS. 1, 3A, and 3, is imperceptible by the naked eye. Accordingly, a sensor with one or a few point pixels, while it does contain defects, may actually be of high enough quality for many applications and therefore could be used for some applications.

Another type of defect is known as a "cluster" defect. A cluster defect is a grouping of physically adjacent point defects, such as those collective grouping of pixels shown at 14.

A disadvantage of the single-threshold method is that it may fail to detect local non-uniformity or "area defects" that are easily observed by the human eye. For example, a portion of the collective pixels at 16 and 18 are above the dark threshold level, so a cluster defect is not detected using the single-threshold method. However, a portion of the neighboring pixels are sufficiently dim that when viewed collectively by the human eye, an area defect is easily observable. Setting a tighter dark (bright) threshold level aids in the area defect detection and cluster description, but this results in a larger number of defects and a definition of a single pixel defect that is not perceived as a defect under normal viewing conditions.

One method for basing classifications on human perception is by detecting local non-uniformity by computing near-neighbor density averages over small subsets of the total array and setting limits on the local average. However, computing local averages requires the collection, and manipulation, of large amounts of data, which results in lengthy testing time and high testing costs.

Accordingly, a need exists for an improved,image classification method that is based on human perception without the associated high test costs.

SUMMARY OF THE INVENTION

The present invention is a novel method and apparatus for classifying the image quality of an image generated by an optical sensor under test. In accordance with the invention, a sensor tester causes a sensor pixel image to be generated by a sensor under test. The sensor pixel image is comprised of a plurality of pixels, each represented by an associated quantized intensity level. The quantized intensity level of a pixel may fall into one of a first pixel class, a second pixel class, or a third pixel class, for example, an acceptable pixel class, a dark pixel class, and a dim pixel class. An image filter processes the sensor pixel image, filtering out all pixels that fall within the acceptable pixel class, to generate a defective pixel map. The defective pixel map includes those pixels which have a quantized intensity level that falls within the second and/or third pixel class but not the first pixel class.

The invention allows a binning processor to process only those pixels from the sensor pixel image that are either definitely defective (i.e., they lie within the third pixel class) or that are suspect (i.e., they fall within the second pixel class). Using local average density calculations on the filtered pixels only, a binning processor can quickly classify the image quality of the sensor under test, as well as identify area defects.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

A novel method and apparatus for classifying the image quality of an optical sensor is described in detail hereinafter. While the invention is described in the context of an optical sensor, those skilled in the art will appreciate that the method and apparatus of the invention may be applied in any digital image binning application.

Figure 4:
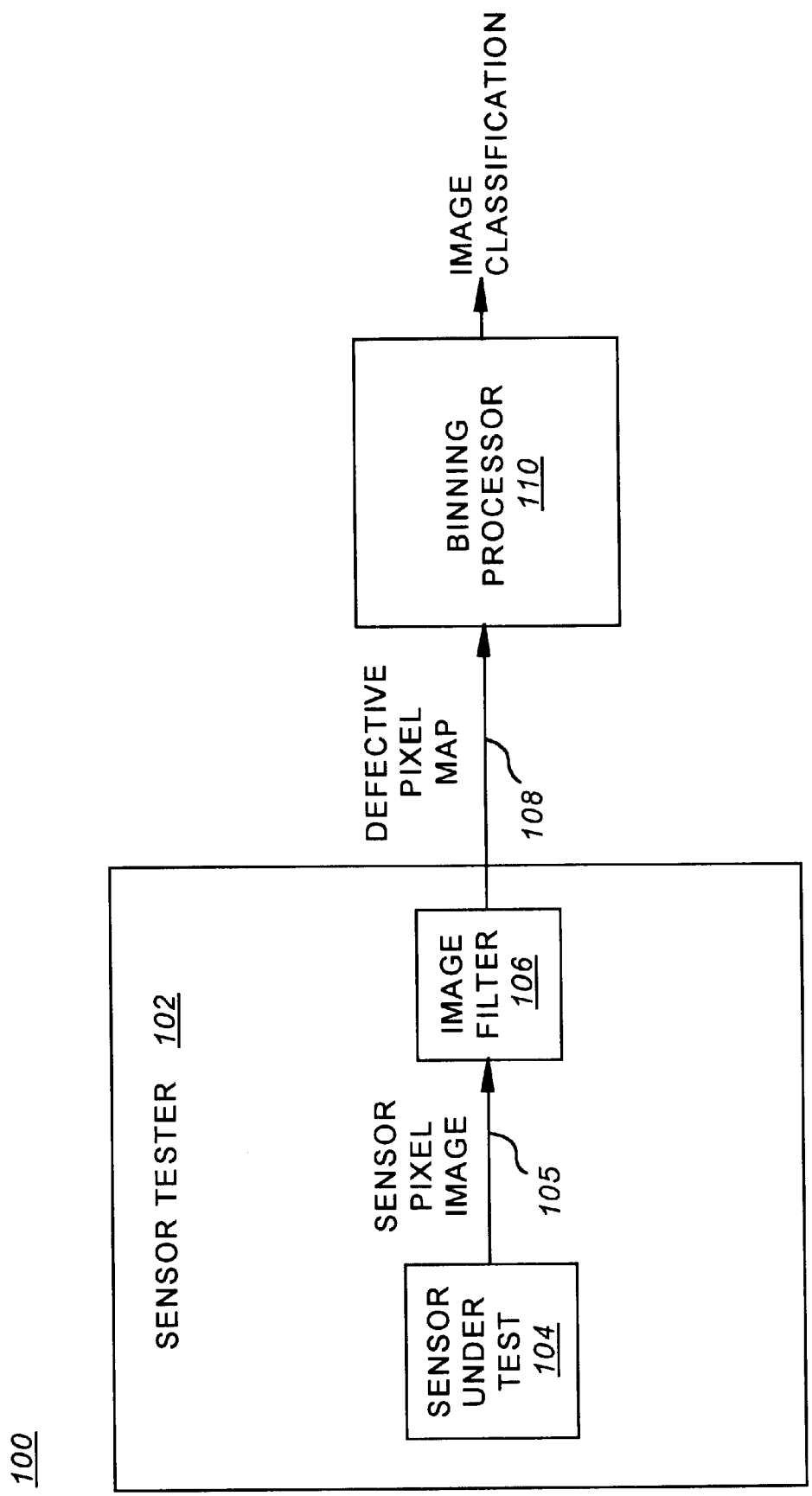
FIG. 4 is an optical sensor testing system 100 in accordance with the invention.

Turning now to FIG. 4, there is presented an optical sensor testing system 100. System 100 includes a sensor tester 102 which tests an optical sensor under test 104. Sensor tester 102 causes a sensor pixel image 105 to be generated from sensor under test 104. In one embodiment, standard imaging conditions used for optical tests employ a tungsten halogen lamp (not shown) to uniformly illuminate the photosite array of sensor under test 104. Sensor pixel image 105 comprises a quantized intensity level for all of the pixels, or a subset thereof, in the image generated by the sensor under test 104.

Figure 5:
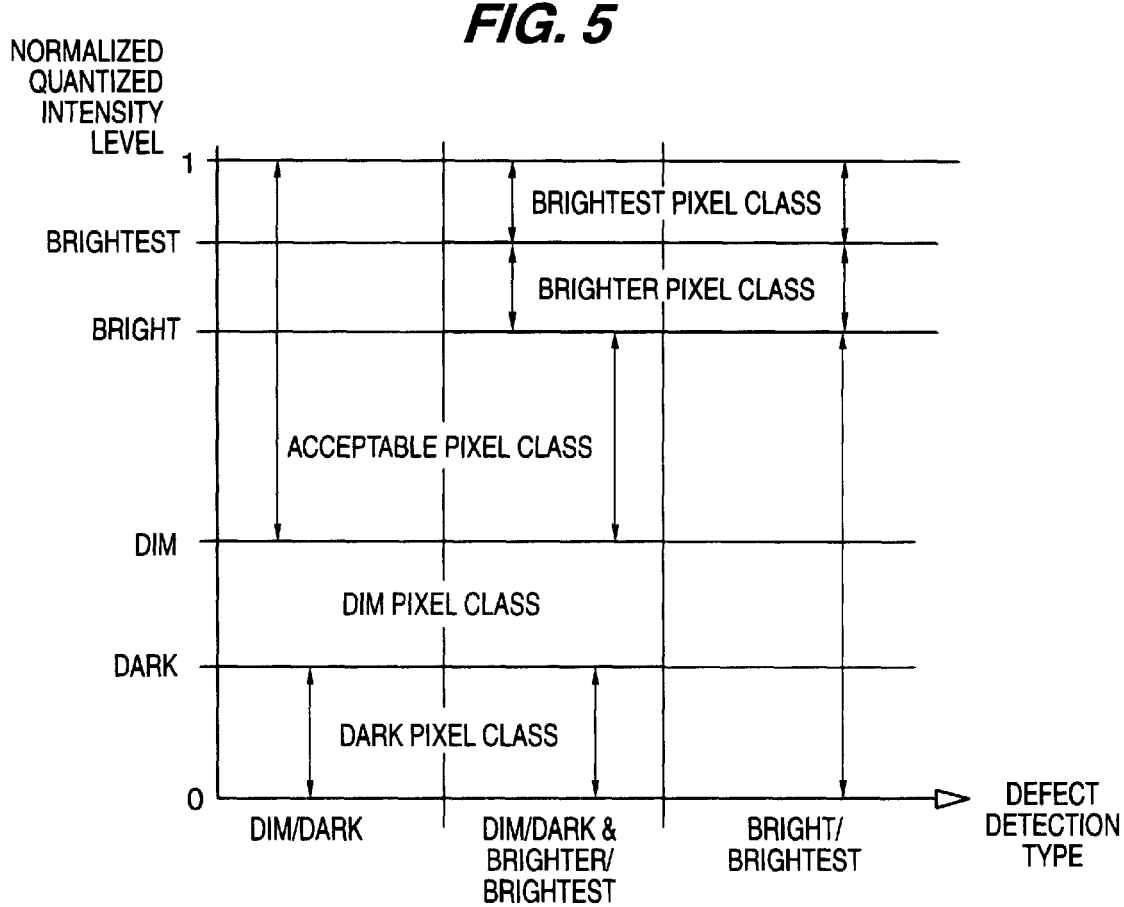
FIG. 5 is a graph illustrating the two-threshold defective pixel system of the invention.
Figure 6:
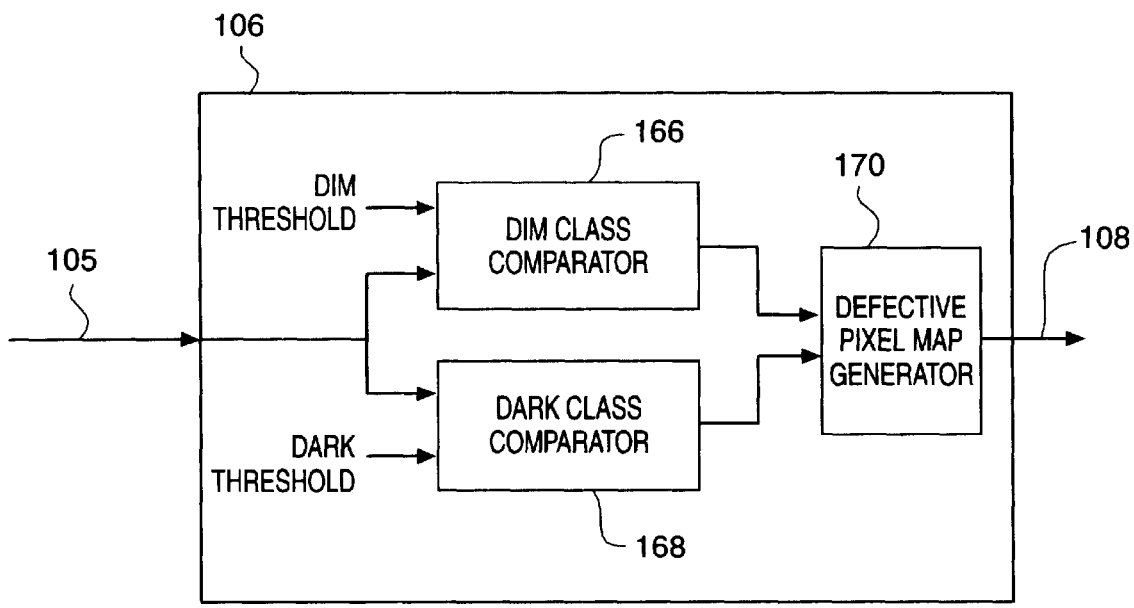
FIG. 6 is a block diagram of one embodiment of an image filter in accordance with the invention.

An image filter 106 processes each pixel of sensor pixel image 105, comparing the quantized intensity level of the pixel to the requirements of a dim (brighter) pixel class and a dark (brightest) pixel class as illustrated in FIG. 5. Those pixels in sensor pixel image 105 that meet the requirements of a dim (brighter) pixel class and/or a dark (brightest) pixel class are added to a defective pixel map 108 associated with the sensor under test 104. Image filter 106 generally comprises a dim (brighter) pixel class comparator 166, shown in FIG. 6, and a dark (brightest) pixel class comparator 168 that compares the quantized intensity level of each pixel to be processed to the class parameters (i.e., the delimiting intensity threshold levels) to determine whether a given pixel falls within its respective class. Image filter 106 may be implemented as a software process or in hardware using a set of dim (brighter) and dark (brightest) comparator circuits. A defective pixel map generator 170 accumulates an entry for each pixel that falls within either the dark (brighter) or dim (brightest) pixel class. In the preferred embodiment, each entry in defective pixel map 108 includes the coordinates and dim/dark (brighter/brightest) classification of its associated pixel. When the entire sensor pixel image 105 has been processed by image filter 106, defective pixel map 108 associated with the particular sensor under test 104 contains a subset of the entire set of image pixels of sensor pixel image 105 that fall into one of the dim/dark (brighter/brightest) classifications. In a typical thereby eliminating most (typically 99%) of the pixels that binning processor 110 must process. Furthermore, because even a relatively small array, such as video graphics array (VGA), represents a very large (307,200) pixel count, the time required to upload the sparse pixel information from sensor tester 102 to a remotely located binning processor 110 is greatly reduced.

Figure 1:
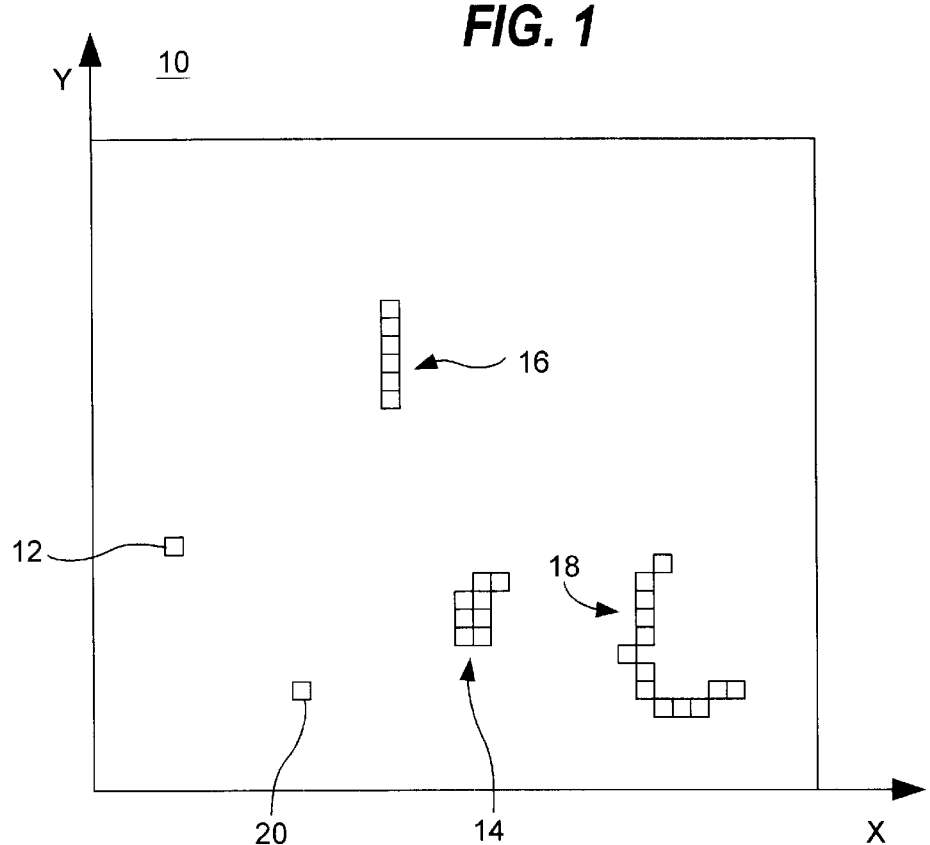
FIG. 1 is a two-dimensional pixel diagram illustrating a blank image 10 that contains several common types of defects.
Figure 2:
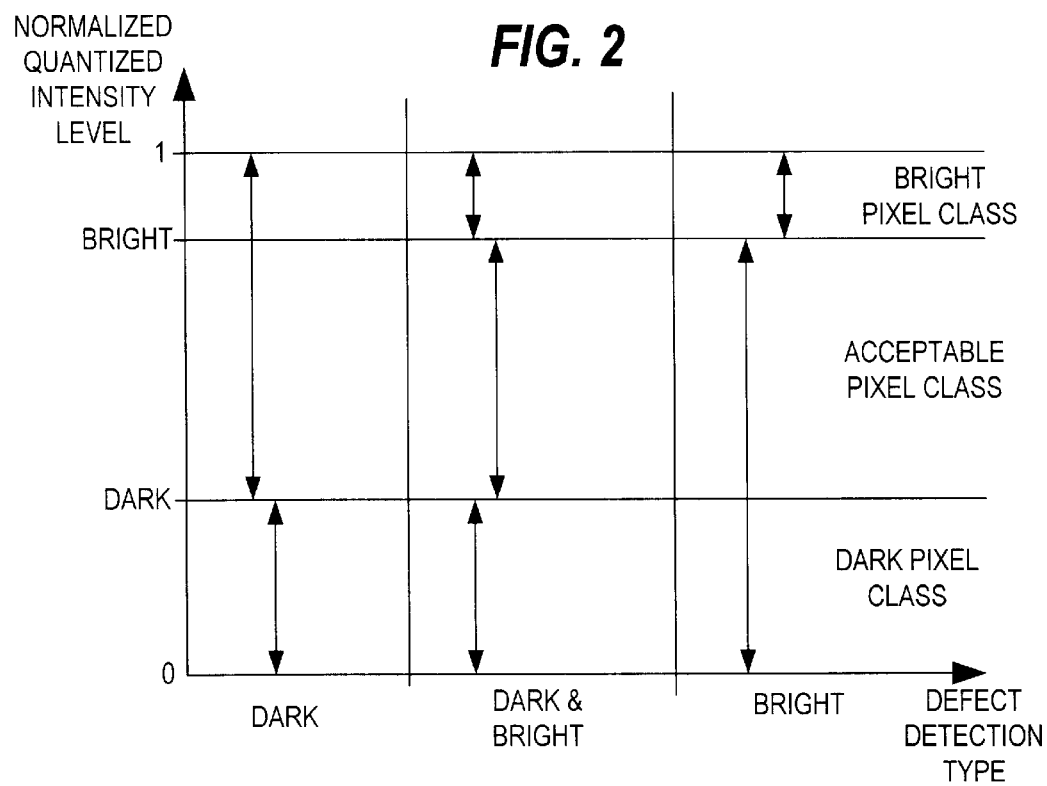
FIG. 2 is a graph illustrating a prior art single-threshold defective pixel system.
Figure 3A:
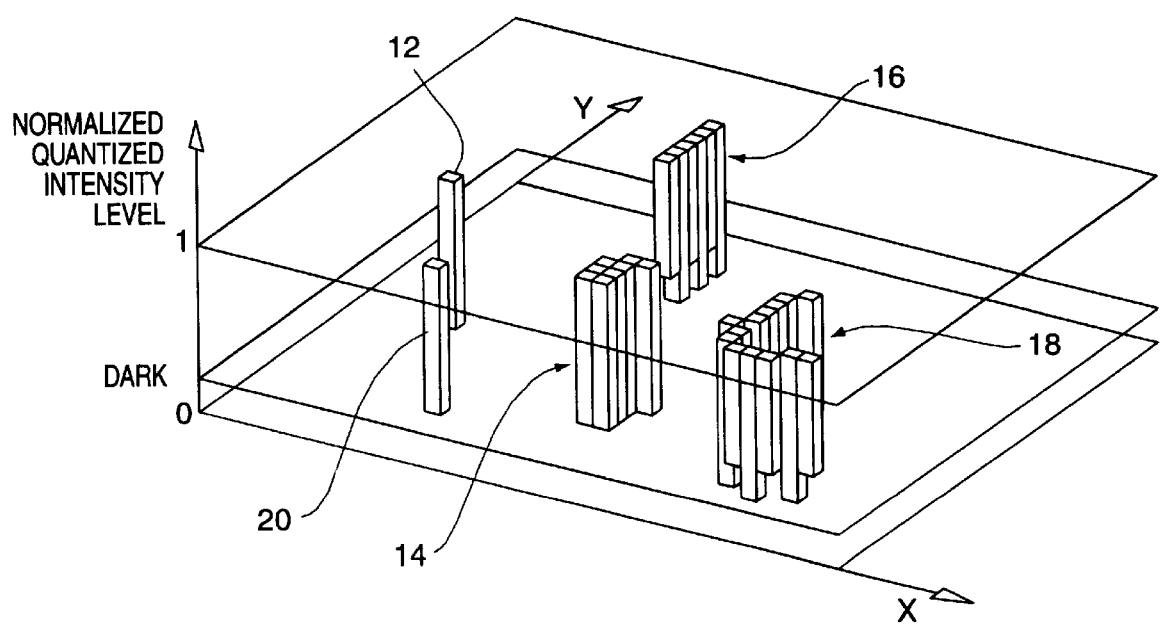
FIG. 3(a) is a perspective view of the pixel image of FIG. 1.
Figure 3B:
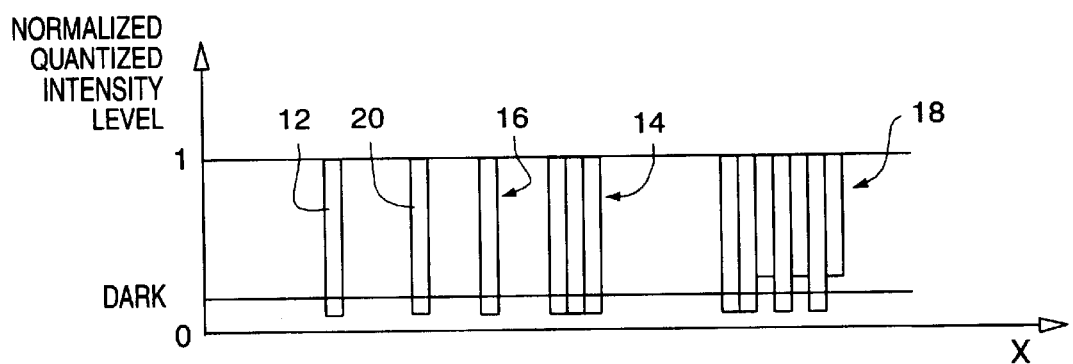
FIG. 3(b) is a side view of the pixel image of FIGS. 1 and 3(a)
Figure 7A:
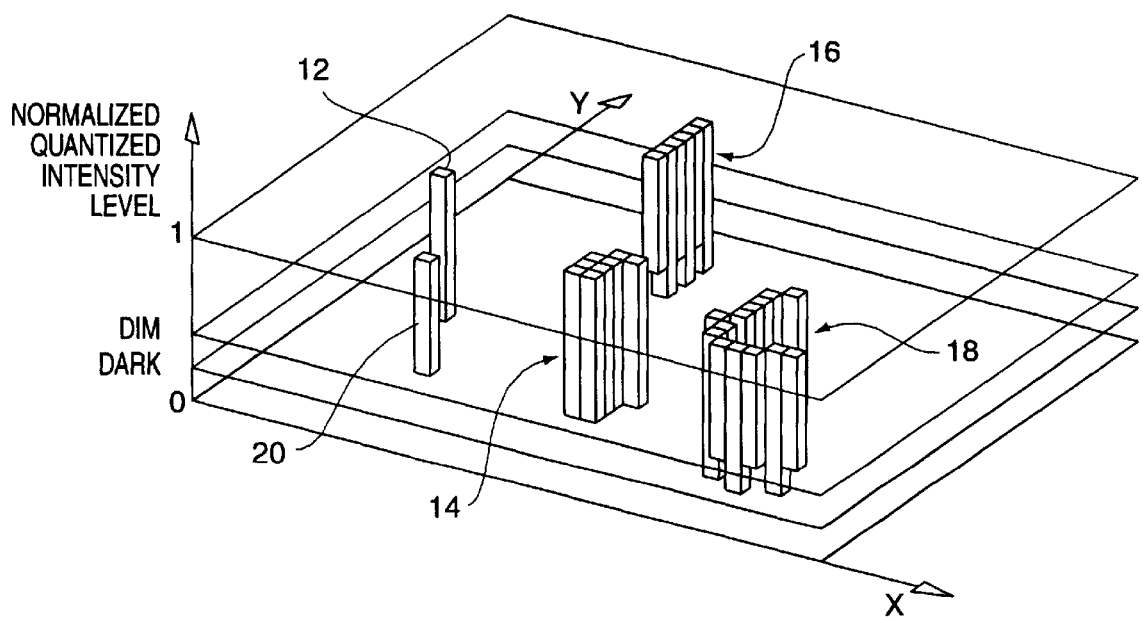
FIG. 7(a) is a perspective view of the pixel image of FIG. 1, illustrating the advantages obtained using the two-threshold method of the invention.
Figure 7B:
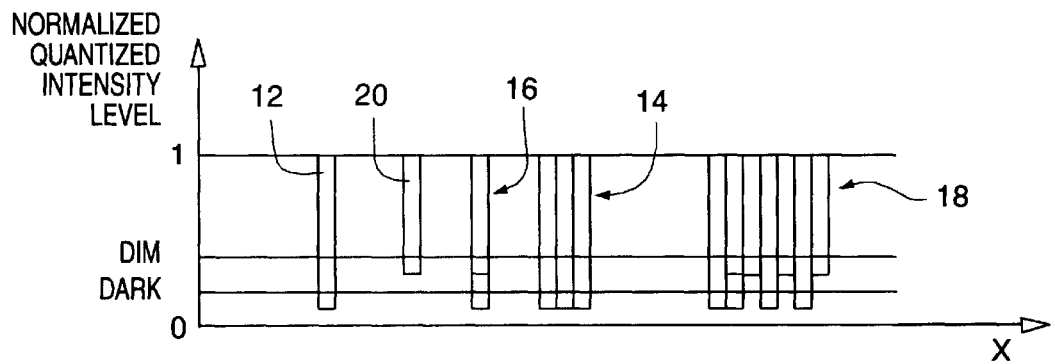
FIG. 7(b) is a side view of the pixel image of FIGS. 1 and 7(a)

FIG. 7(a) is a perspective view, and FIG. 7(b) is a side view, of the pixel image of FIG. 1, illustrating the different-manufacturing yield results that would be obtained using the two-threshold method of the invention. In this example, the dark threshold level can be relaxed such that pixel 20, which is of an intensity level that would be imperceptible to the human eye, is not flagged as a defect, yet pixel 12, which is sufficiently dark that it could be perceived, is captured as a defect. In addition, because the invention calls for a new dim pixel class, the detection of area defects becomes much easier for a binning processor 110. A number of adjacent or near-neighbor dim pixels may signify an area defect that is perceptible to the human eye, that otherwise would not be detected using the prior art single-threshold method.

Neighbor distance defines when point defects are combined into a cluster defect. By using a large neighbor distance a sparse set of dim pixels, which may not be detected under a single-threshold model, is combined into a cluster. The severity of a cluster is evaluated in terms of its darkness and its size. An area defect occurs when the average intensity is exceeded for large clusters. For small cluster sizes, darkness is described in terms of the number of dark and dim pixels.

Binning processor 110 processes defective pixel map 108 to determine which image classification the sensor under test 104 falls into. Binning processor 110 may be implemented in hardware or software, and may reside within, or remote from, sensor tester 102. Image classification is manufacturer specific, and the gradings and criteria used to determine each grade level typically vary from manufacturer to manufacturer. However, with the detection of different intensity level classifications, such as the dim (brighter) and dark (brightest) classifications, detected in the present invention, binning processor 110 may be implemented with more intelligence to classify images based on human perception. For example, binning processor 110 performs local average density calculations only on the pixels contained in the defective pixel map 108 to detect area defects that might otherwise go undetected. Furthermore, because binning processor 110 processes only a minute subset of pixels from the full image, more sophisticated intelligence may be implemented yet still reduce the test time over prior art image classification techniques.

Figure 8:
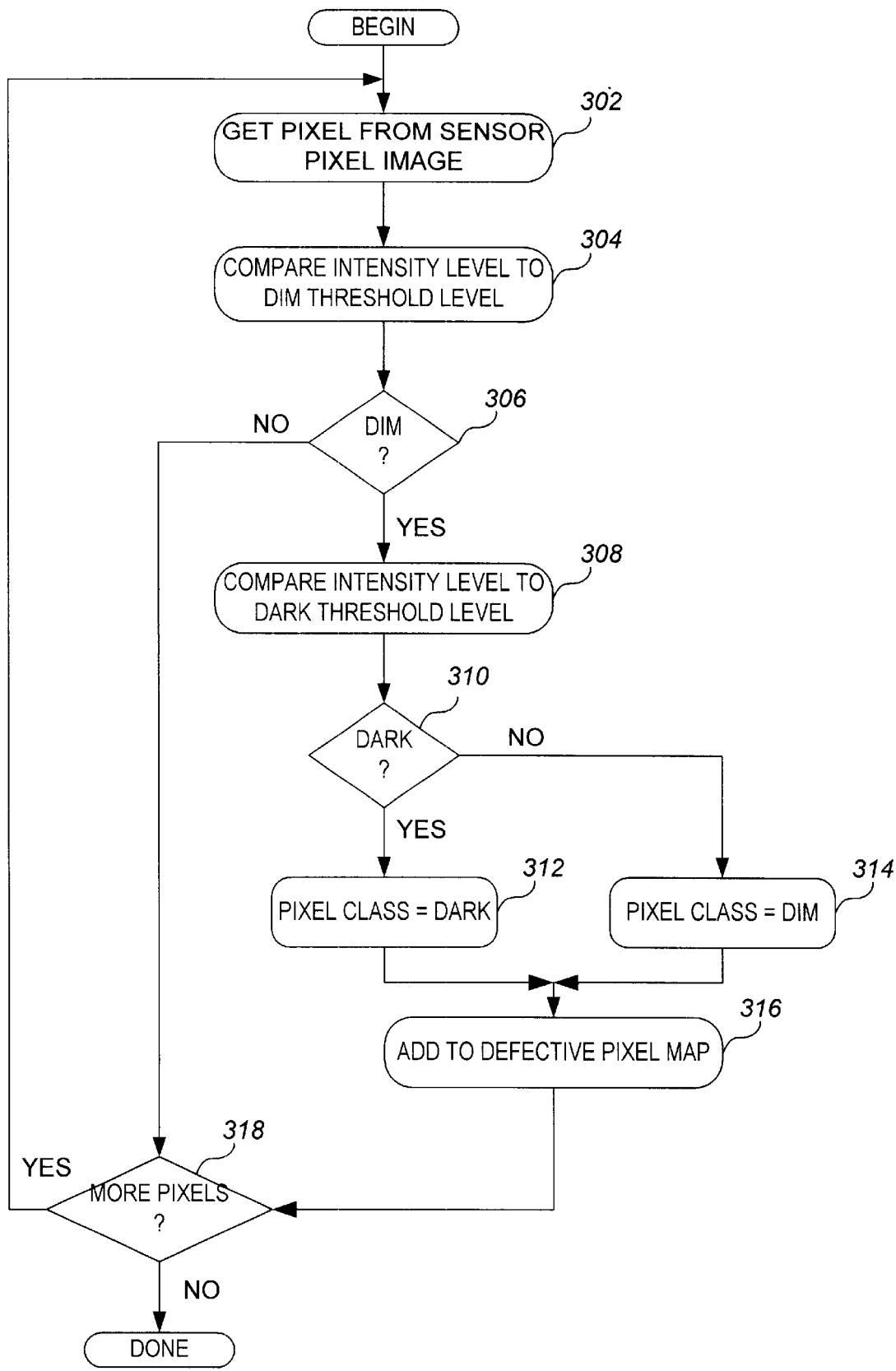
FIG. 8 is a flowchart of one embodiment of a method in accordance with the invention.

FIG. 8 is a flowchart of one embodiment of a method performed by image filter 106. In a step 302 a pixel is obtained from sensor pixel image 105. The pixel intensity value is compared to a dim (brighter) threshold level, which is brighter (darker) in intensity than the dark (brightest) threshold level. A determination is made in step 304 as to whether the pixel intensity value is at or below the dim (brighter) threshold level in step 306. If not, proceed to step 318. If it is, the pixel intensity value is compared to the dark (brightest) threshold level in step 308. In step 310, a determination is made as to whether the pixel intensity value is at or below the dark (brightest) threshold level. If the pixel intensity value is at or below the dark (brightest) threshold level, the pixel is marked as belonging to the "dark" pixel class in step 312. If the pixel intensity value is above the dark (brightest) threshold level, the pixel is marked as belonging to the "dim" pixel class in step 314. Because the pixel was classified as either "dark" or "dim" in respective step 312 or 314, the pixel is added to the defective pixel map 108 in step 316. If sensor pixel image 105 contains more pixels as yet to be processed by image filter 106, as determined in step 318, steps 302 through 318 are repeated. When all pixels in sensor pixel image 105 have been processed, method 300 is complete.

Those skilled in the art will appreciated that although the method 300 serially processes pixels of sensor pixel image 105, the pixels may, in the alternative, be processed in parallel. Parallel processing of the pixel image is especially appropriate if the pixel intensity values of sensor under test 104 are available in parallel via multiple pins.

As described in detail above, the present invention provides an efficient technique for classifying images according to human perception using only a sparse data set.

What is claimed is:

1. An optical sensor testing system for classifying an image quality of an image generated by an optical sensor under test, comprising:
   a sensor tester which causes a sensor pixel image to be generated by said sensor under test, said sensor pixel image comprising a plurality of pixels, each of said plurality of pixels represented by an associated quantized intensity level, said quantized intensity level being within one of a first pixel class representing a first range of intensity levels, a second pixel class representing a second range of intensity levels above or below said first range of intensity levels, or a third pixel class representing a third range of intensity levels, said third range of intensity levels above said second range of intensity levels if said second range of intensity levels is above said first range of intensity levels, and said third range of intensity levels below said second range of intensity levels if said second range of intensity levels is below said first range of intensity levels; and
   an image filter which processes said sensor pixel image to generate a defective pixel map, said image filter generating an entry in said defective pixel map for each pixel having a quantized level in said second pixel class and each pixel having a quantized level in said third pixel class but generating no entry in said defective pixel map for any pixel In said first pixel class.

2. A system in accordance with claim 1, wherein:
   said image filter comprises:
      a first comparator for determining whether said quantized pixel intensity falls within said second pixel class; and
      a second comparator for determining whether said quantized pixel intensity falls within said third pixel class.

3. A system in accordance with claim 1, comprising:
   a binning processor which processes said defective pixel map to determine an image quality classification for said sensor under test, said image quality classification indicating which of a plurality of quality categories said sensor under test belongs to.

4. A system in accordance with claim 1, wherein:
   said second pixel class comprises a dim pixel class comprising pixels below a dim threshold level but above a dark threshold level;
   said third pixel class comprises a dark pixel class comprising pixels below said dark threshold level.

5. A system in accordance with claim 1, wherein:
   said second pixel class comprises a brighter pixel class comprising pixels above a brighter threshold level but below a brightest threshold level;
   said third pixel class comprises a brightest pixel class comprising pixels above said brightest threshold level.

6. A system in accordance with claim 1, wherein:
   said plurality of pixels of said sensor pixel image may further be represented by an associated quantized intensity level being within a fourth pixel class representing a fourth range of intensity levels, or a fifth pixel class representing a fifth range of intensity levels, said fourth range of intensity levels being above said first range of intensity levels if said second range of intensity levels is below said first range of intensity levels and being below said first range of intensity levels if said second range of intensity levels is above said first range of intensity levels, and said fifth range of intensity levels above said fourth range of intensity levels if said fourth range of intensity levels is above said first range of intensity levels and being below said fourth range of intensity levels if said fourth range of intensity levels is below said first range of intensity levels; and said image filter further generating an entry in said defective pixel map for each pixel having a quantized level in said fourth pixel class and each pixel having a quantized level in said fifth pixel class.

7. A system in accordance with claim 6, wherein:

said second pixel class comprises a dim pixel class comprising pixels below a dim threshold level but above a dark threshold level;

said third pixel class comprises a dark pixel class comprising pixels below said dark threshold level; and said fourth pixel class comprises a brighter pixel class comprising pixels above a brighter threshold level but below a brightest threshold level; and said fifth pixel class comprises a brightest pixel class comprising pixels above said brightest threshold level.

8. An image filter for processing a sensor pixel image, said sensor pixel image comprising a plurality of pixels, each of said plurality of pixels represented by an associated quantized intensity level, said quantized intensity level being within one of a first pixel class representing a first range of intensity levels, a second pixel class representing a second range of intensity levels above or below said first range of intensity levels, or a third pixel class representing a third range of intensity levels, said third range of intensity levels above said second range of intensity levels if said second range of intensity levels is above said first range of intensity levels, and said third range of intensity levels below said second range of intensity levels if said second range of intensity levels is below said first range of intensity levels, said image filter comprising:

an image filter input which receives said plurality of pixels of said sensor pixel image;

a filter which determines which of said first pixel class, said second pixel class, or said third pixel class that each of said quantized intensity levels associated with said plurality of pixels of said sensor pixel image falls within; and an image filter output which outputs an indication of each pixel having a quantized level in said second pixel class and each pixel having a quantized level in said third pixel class but outputs no indication for any pixel in said first pixel class.

9. An image filter in accordance with claim 8, comprising:

a defective pixel map generator responsive to said indications from said image filter output to generate a defective pixel map, said defective pixel map generator generating an entry in said defective pixel map for each pixel having a quantized level in said second pixel class and each pixel having a quantized level in said third pixel class but generating no entry in said defective pixel map for any pixel in said first pixel class.

10. An image filter in accordance with claim 8, wherein:

said filtering means comprises:

a first comparator for determining whether said quantized pixel intensity falls within said second pixel class; and a second comparator for determining whether said quantized pixel intensity falls within said third pixel class.

11. An image filter in accordance with claim 8, wherein:

said second pixel class comprises a dim pixel class comprising pixels below a dim threshold level but above a dark threshold level;

said third pixel class comprises a dark pixel class comprising pixels below said dark threshold level.

12. An image filter in accordance with claim 8, wherein:

said second pixel class comprises a brighter pixel class comprising pixels above a brighter threshold level but below a brightest threshold level; said said third pixel class comprises a brightest pixel class comprising pixels above said brightest threshold level.

13. An image filter in accordance with claim 8, wherein:

said plurality of pixels of said sensor pixel image may further be represented by an associated quantized intensity level being within a fourth pixel class representing a fourth range of intensity levels, or a fifth pixel class representing a fifth range of intensity levels, said fourth range of intensity levels being above said first range of intensity levels if said second range of intensity levels is below said first range of intensity levels and being below said first range of intensity levels if said second range of intensity levels is above said first range of intensity levels, and said fifth range of intensity levels above said fourth range of intensity levels if said fourth range of intensity levels is above said first range of intensity levels and being below said fourth range of intensity levels if said fourth range of intensity levels is below said first range of intensity levels; and said image filter output also outputs an indication of each pixel having a quantized level in said fourth pixel class and each pixel having a quantized level in said fifth pixel class.

14. An image filter in accordance with claim 13, wherein:

said second pixel class comprises a dim pixel class comprising pixels below a dim threshold level but above a dark threshold level;

said third pixel class comprises a dark pixel class comprising pixels below said dark threshold level; and said fourth pixel class comprises a brighter pixel class comprising pixels above a brighter threshold level but below a brightest threshold level; and said fifth pixel class comprises a brightest pixel class comprising pixels above said brightest threshold level.

15. A method for classifying an image quality of an image generated by an optical sensor under test, comprising:

obtaining a sensor pixel image generated by said sensor under test, said sensor pixel image comprising a plurality of pixels, each of said plurality of pixels represented by an associated quantized intensity level, said quantized intensity level being within one of a first pixel class representing a first range of intensity levels, a second pixel class representing a second range of intensity levels above or below said first range of intensity levels, or a third pixel class representing a third range of intensity levels, said third range of intensity levels above said second range of intensity levels if said second range of intensity levels is above said first range of intensity levels, and said third range of intensity levels below said second range of intensity levels if said second range of intensity levels is below said first range of intensity levels; and generating a defective pixel map by generating an entry in said defective pixel map for each pixel having a quantized level in said second pixel class and each pixel having a quantized level in said third pixel class but generating no entry in said defective pixel map for any pixel in said first pixel class.

16. A method in accordance with claim 15, comprising:

creating an image from said sensor under test to generate said sensor pixel image.

17. A method in accordance with claim 15, wherein:

said generating step comprises:
- obtaining a quantized intensity level associated with an unprocessed one of said plurality of pixels;
- comparing said quantized intensity level to a set of predetermined first pixel class parameters which define said second pixel class;
- determining whether said quantized intensity level falls within said second pixel class;
- comparing said quantized intensity level to a set of predetermined second pixel class parameters which define said third pixel class;
- determining whether said quantized intensity level falls within said third pixel class;
- adding said unprocessed one of said plurality of pixels to said defective pixel map if said quantized intensity level associated with said unprocessed one of said plurality of pixels falls within either said second pixel class or said third pixel class; and
- repeating said obtaining step through said adding step if said plurality of pixels comprises one or more unprocessed pixels.

18. A method in accordance with claim 15, wherein:

said second pixel class comprises a dim pixel class comprising pixels below a dim threshold level but above a dark threshold level;

said third pixel class comprises a dark pixel class comprising pixels below said dark threshold level.

19. A method in accordance with claim 15, wherein:

said second pixel class comprises a brighter pixel class comprising pixels above a brighter threshold level but below a brightest threshold level;

said third pixel class comprises a brightest pixel class comprising pixels above said brightest threshold level.

20. A method In accordance with claim 15, wherein:

said plurality of pixels of said sensor pixel image may further be represented by an associated quantized intensity level being within a fourth pixel class representing a fourth range of intensity levels, or a fifth pixel class representing a fifth range of intensity levels, said fourth range of intensity levels being above said first range of intensity levels if said second range of intensity levels is below said first range of intensity levels and being below said first range of intensity levels if said second range of intensity levels is above said first range of intensity levels, and said fifth range of intensity levels above said fourth range of intensity levels if said fourth range of intensity levels is above said first range of intensity levels and being below said fourth range of intensity levels if said fourth range of intensity levels is below said first range of intensity levels; and said step of generating a defective pixel map further includes generating an entry in said defective pixel map for each pixel having a quantized level in said fourth pixel class and each pixel having a quantized level in said fifth pixel class but no entry for any pixel in said first pixel class.

21. A method in accordance with claim 20, wherein:

said second pixel class comprises a dim pixel class comprising pixels below a dim threshold level but above a dark threshold level;

said third pixel class comprises a dark pixel class comprising pixels below said dark threshold level; and said fourth pixel class comprises a brighter pixel class comprising pixels above a brighter threshold level but below a brightest threshold level; and said fifth pixel class comprises a brightest pixel class comprising pixels above said brightest threshold level.

* * * * *